(12) United States Patent  
Snyder

(10) Patent No.: US 12,370,941 B2  
(45) Date of Patent: Jul. 29, 2025

(54) VEHICLE REAR TAIL LAMP STRUCTURE

(71) Applicant: NISSAN NORTH AMERICA, INC., Franklin, TN (US)

(72) Inventor: David Snyder, Southfield, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 84 days.

(21) Appl. No.: 18/346,004

(22) Filed: Jun. 30, 2023

(65) Prior Publication Data  
US 2025/0001929 A1  Jan. 2, 2025

(51) Int. Cl.  
*B60Q 1/30* (2006.01)  
*B60J 5/10* (2006.01)

(52) U.S. Cl.  
CPC .. *B60Q 1/30* (2013.01); *B60J 5/10* (2013.01)

(58) Field of Classification Search  
CPC ..... B60J 5/00; B60J 5/10; B60J 5/107; B60Q 1/26; B60Q 1/30; B60Q 1/44; F21V 3/00; F21V 19/00; F21V 23/00  
See application file for complete search history.

(56) References Cited

U.S. PATENT DOCUMENTS

| D791,375 S | 7/2017 | Lichte | |
|---|---|---|---|
| 2015/0252975 A1* | 9/2015 | Nakada | F21S 41/265 |
| | | | 362/521 |
| 2018/0056762 A1* | 3/2018 | Adachi | F21V 3/00 |
| 2018/0056855 A1* | 3/2018 | Happy | B60Q 1/304 |
| 2022/0090767 A1* | 3/2022 | Suzuki | F21V 23/005 |
| 2022/0355727 A1 | 11/2022 | Saez Cruz et al. | |

FOREIGN PATENT DOCUMENTS

DE 102018108134 B3 10/2019

* cited by examiner

*Primary Examiner* — Van T Trieu  
(74) *Attorney, Agent, or Firm* — Global IP Counselors, LLP

(57) ABSTRACT

A vehicle rear tail lamp structure includes a rear door and a rear lamp housing. The rear door has an upper outer panel portion and a lower outer panel portion, with a rear lamp recess defined between a lower edge of the upper outer panel portion and an upper edge of the lower outer panel portion. The rear lamp housing has a main body with an upper edge, a lower edge and at least one rearwardly projecting protrusion. The upper edge is located along the lower edge of the upper outer panel portion. The lower edge is located along the upper edge of the lower outer panel portion. The protrusion extends below the upper edge of the lower outer panel portion below the rear lamp recess overlaying a portion of the lower outer panel portion below the upper edge of the lower outer panel portion.

18 Claims, 7 Drawing Sheets

VEHICLE REAR TAIL LAMP STRUCTURE

BACKGROUND

Technical Field

The present disclosure generally relates to a vehicle rear tail lamp structure. More specifically, the present disclosure relates to a vehicle rear tail lamp structure that includes an elongated recess formed in a metallic rear door of the vehicle with a single tail lamp housing installed therein, the tail lamp housing having at least one protrusion that extends downward below the recess overhanging a portion of the rear door below the elongated recess.

Background Information

Manufacturing metal body parts for a vehicle presents many challenges during the manufacturing process. Manufacturing a portion of a vehicle that includes multiple contours and recesses having irregular, non-linear shapes is particularly challenging and expensive.

SUMMARY

On object of the present disclosure is to provide a metallic body part with a recess that is defined by simplified structure having linear/plana surfaces dimensioned to receive a tail lamp housing that includes non-linear features that overhang surfaces of the metallic body part adjacent to the recess.

In view of the state of the known technology, one aspect of the present disclosure is to provide a vehicle rear tail lamp structure with a rear door and a rear lamp housing. The rear door has an upper outer panel portion and a lower outer panel portion, with a rear lamp recess defined between a lower edge of the upper outer panel portion and an upper edge of the lower outer panel portion. The rear lamp housing has a main body with an upper edge, a lower edge and at least one rearwardly projecting protrusion. The upper edge is located along the lower edge of the upper outer panel portion. The lower edge is located along the upper edge of the lower outer panel portion. The protrusion extends below the upper edge of the lower outer panel portion below the rear lamp recess overlaying a portion of the lower outer panel portion below the upper edge of the lower outer panel portion.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
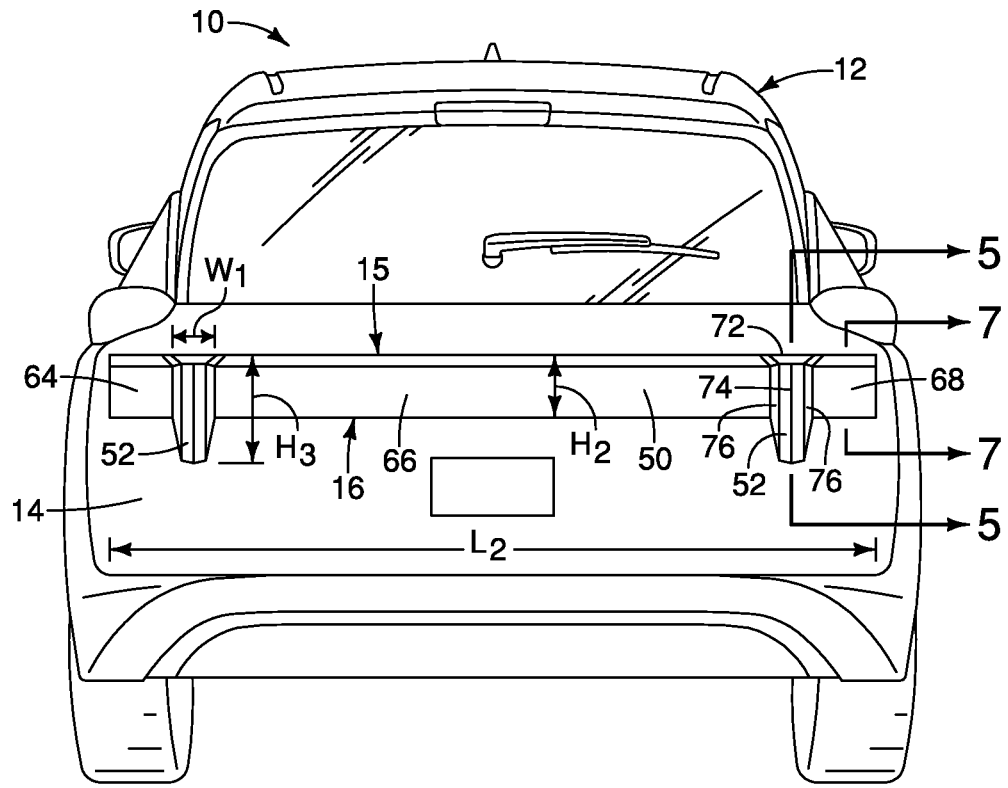
FIG. 1 is a rear view of a vehicle showing a rear door supporting a rear lamp housing that includes a pair of projections that extend downward and rearward from a main body of the rear lamp housing defining an overhang in accordance with a first embodiment.

Referring initially to FIG. 1, a vehicle 10 that includes a vehicle body structure 12 and a rear door 14 is illustrated in accordance with a first embodiment.

The vehicle 10 can be any of a variety of vehicle designs, such as a sports utility vehicle (SUV), a sedan or coupe. The rear door 14 can be a trunk lid or a rear hatch door of an SUV.

The rear door 14 is designed and dimensioned to receive and support a rear lamp housing 16 defining a vehicle rear tail lamp structure 15, as shown in FIG. 1. The rear door 14 includes an elongated recess 18 dimensioned to receive the rear lamp housing 16, as described in greater detail below.

As shown in FIGS. 2-5, the rear door 14 includes an inner door panel 20 and an outer door panel 22. In the area of the elongated recess 18 (herein after the recess 18), the inner door panel 20 and the outer door panel 22 are spaced apart from one another. At lateral sides, top and bottom areas of the rear door 14, the inner door panel 20 and the outer door panel 22 are fixed to one another via, for example, welding techniques, in a conventional manner (not shown). The inner door panel 20 and the outer door panel 22 are made of a metallic material such as sheet metal, or other metallic metal material suitable for automotive body structure construction.

Figure 3:
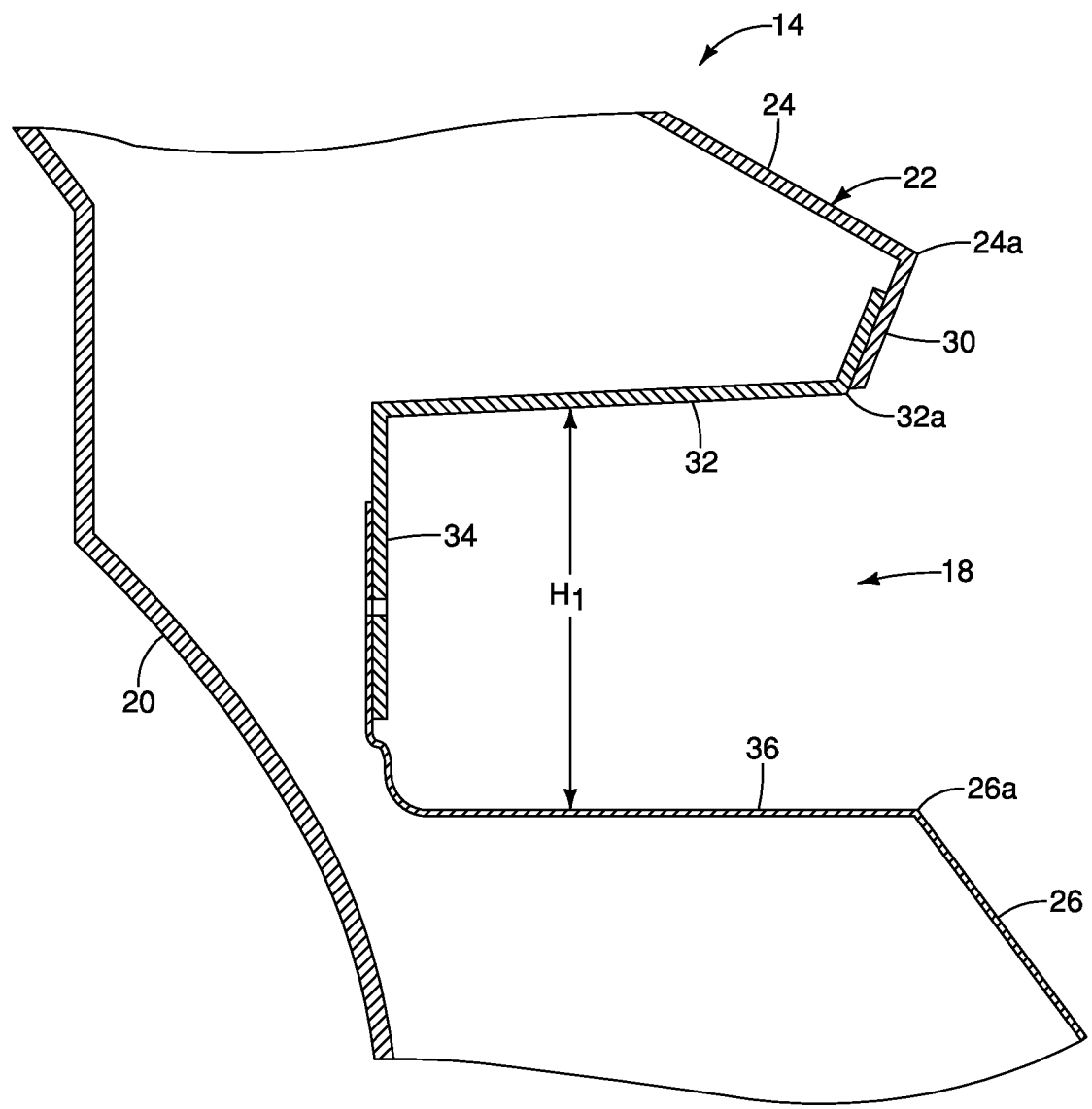
FIG. 3 is a side cross-sectional view of the rear door taken along the line 3-3 in FIG. 2 showing details of the elongated recess in accordance with the first embodiment.
Figure 4:
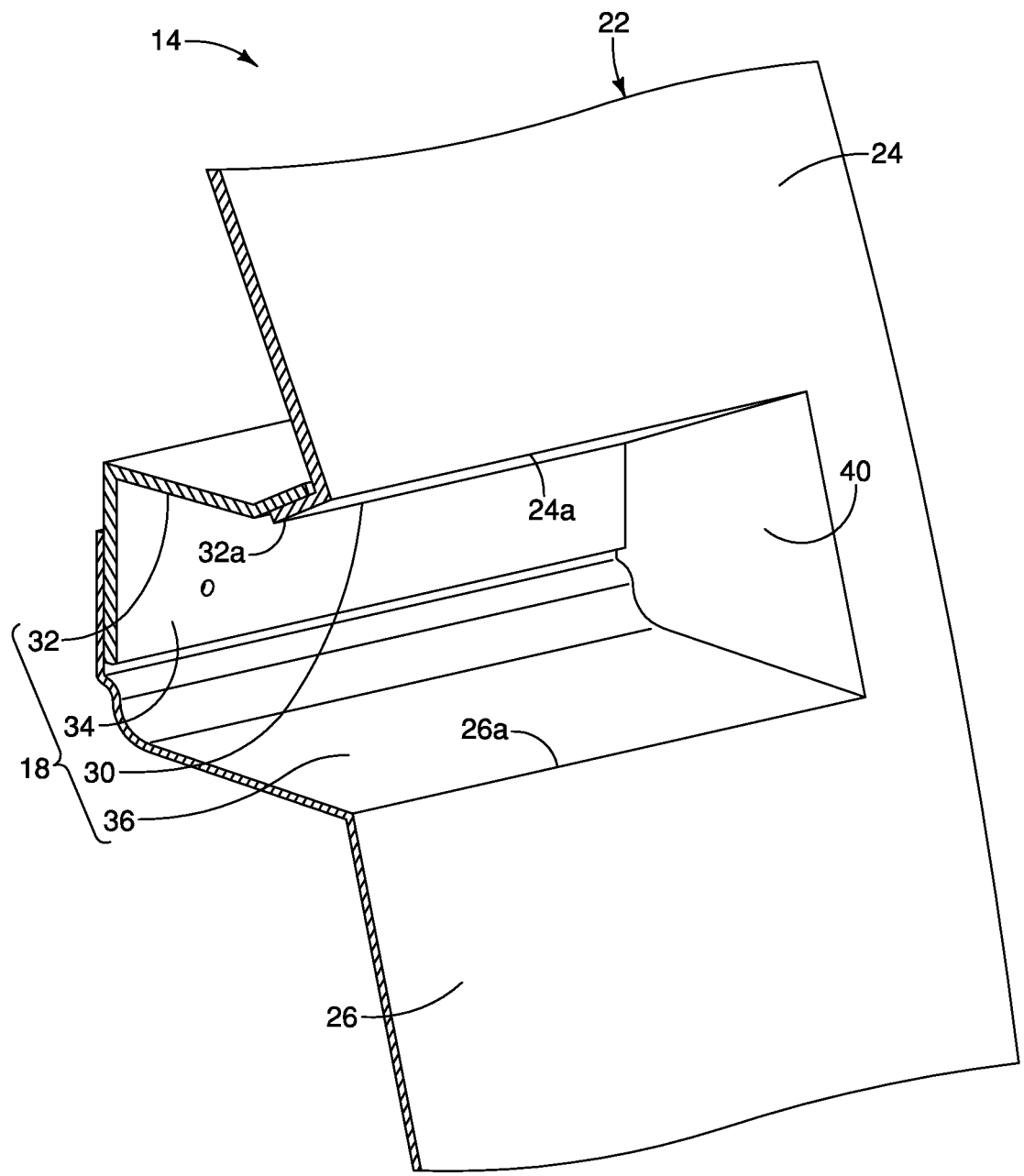
FIG. 4 is a perspective cross-sectional view of the rear door also taken along the line 3-3 in FIG. 2 showing details of the elongated recess in accordance with the first embodiment.
Figure 5:
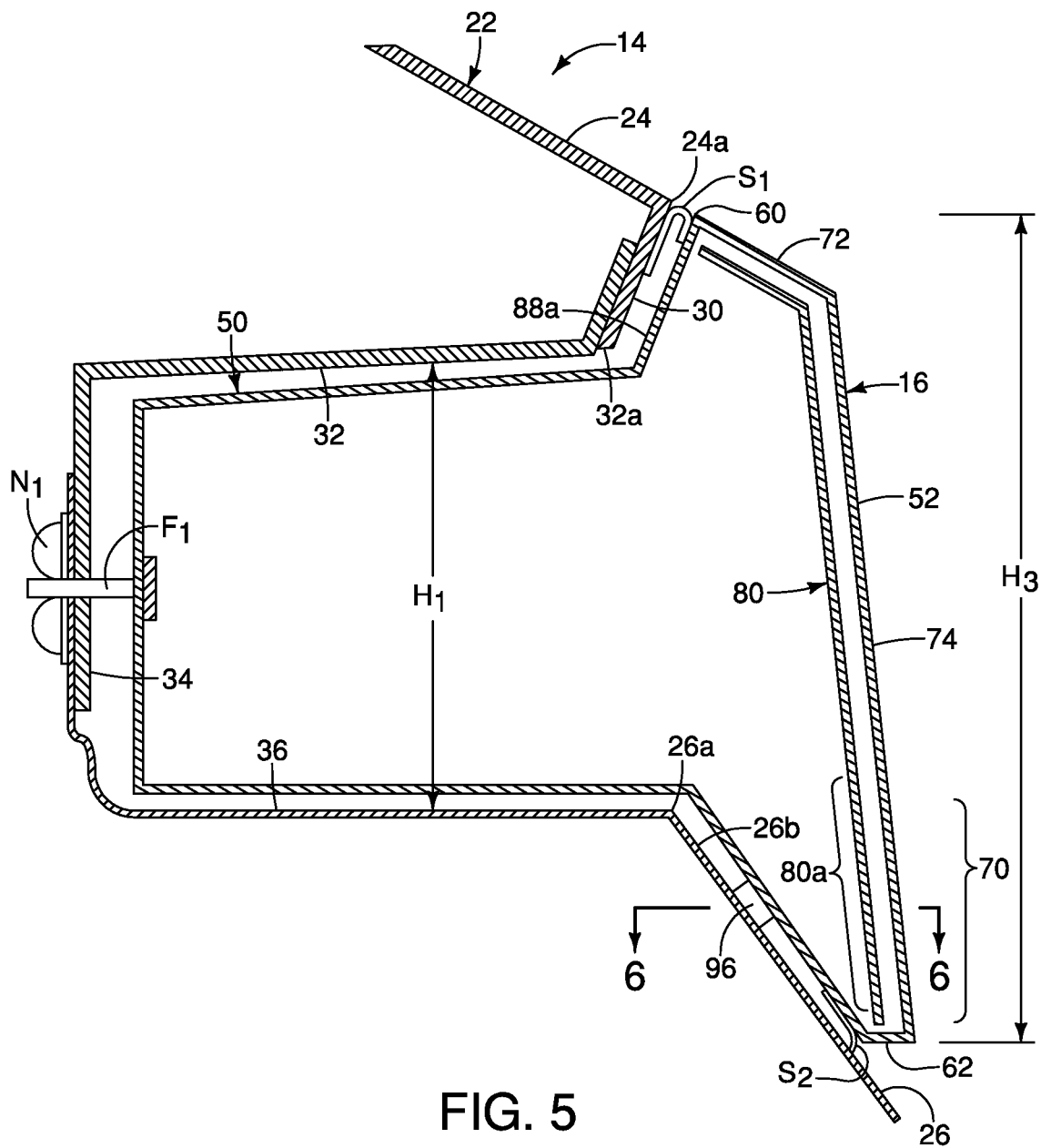
FIG. 5 is a side cross-sectional view of the rear door taken along the line 5-5 in FIG. 2 showing details of the elongated recess and the rear lamp housing with the rear lamp housing installed to the elongated recess in accordance with the first embodiment.

The outer door panel 22 (facing rearward) can be constructed from several panels welded to one another. For example, as shown in FIGS. 3-5, the outer door panel 22 can include three or more panels that define the overall shape and dimensions of the elongated recess 18.

However, the depiction of multiple panels does not limit the construction of the outer door panel 22. Three or more, or three or fewer panels can be welded to one another to define the elongated recess 18 (also referred to as the rear lamp recess 18).

For example, the outer door panel 22 of the rear door 14 can have an upper outer panel portion 24 and a lower outer panel portion 26. The rear lamp recess 18 is defined between a lower edge 24a of the upper outer panel portion 24 and an upper edge 26a of the lower outer panel portion 26. The upper outer panel portion 24, the material that defines the rear lamp recess 18 and the lower outer panel portion 26 are all formed from metal sheet materials welded together.

Figure 2:
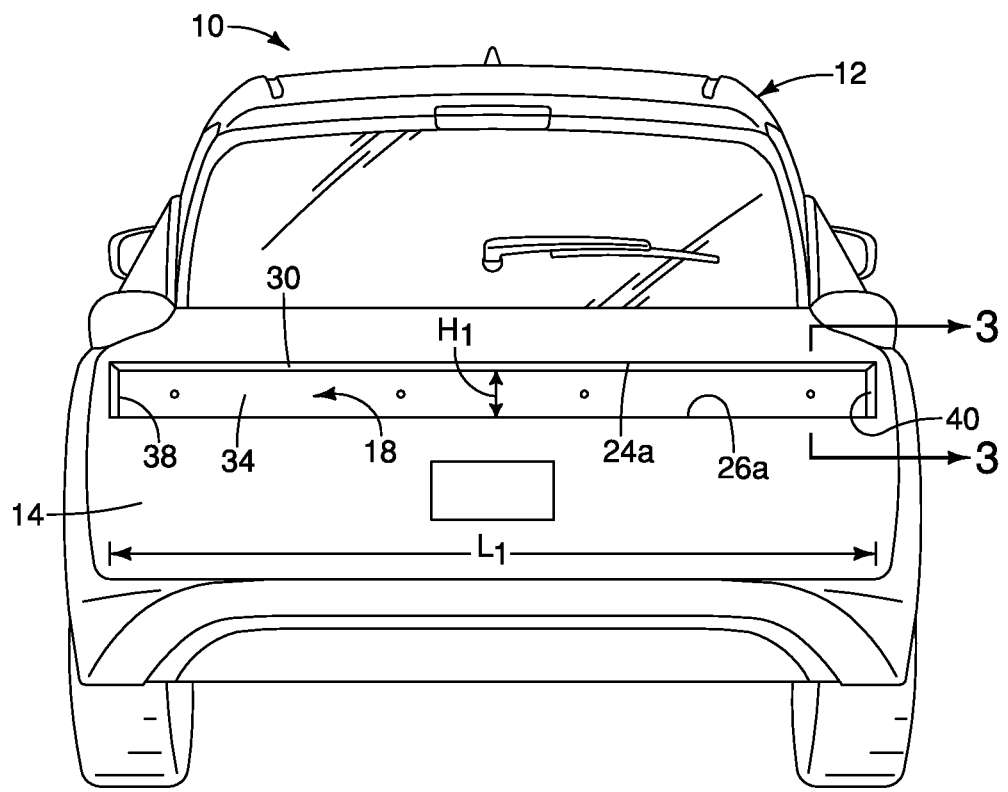
FIG. 2 is another rear view of a vehicle similar to FIG. 1 that shows the rear door with the rear lamp housing removed showing an elongated recess that receives a portion of the main body of the rear lamp housing in accordance with the first embodiment.

As shown in FIG. 2, the elongated recess 18 spans most of the width of the rear door 14. The elongated recess 18 can have an overall horizontal length $L_1$ that is between 70% and 90% of the overall width of the rear door 14, or any value therebetween. The rear lamp recess 18 has a height $H_1$ measured from the lower edge 24a of the upper outer panel portion 24 to the upper edge 26a of the lower outer panel portion 26.

The rear lamp recess 18 is defined by various portions of the panel(s) that form the outer door panel 22. More specifically, the rear lamp recess 18 is defined by an inclined wall portion 30, an upper wall portion 32, a vertical wall portion 34, a lower wall portion 36 and lateral end walls 38 and 40. The upper wall portion 32 and the lower wall portion 36 extend in generally horizontal directions and can be approximately parallel or fully parallel to one another. The vertical wall portion 34 extends between the upper wall portion 32 and the lower wall portion 36 defining a back wall of the rear lamp recess 18.

The inclined wall portion 30 extends upward and rearward (relative to the vehicle 10) from a rear edge 32a of the upper wall portion 32 to the lower edge 24a of the upper outer panel portion 24.

A description of the rear lamp housing 16 is now provided with reference to FIGS. 1 and 5-8. The rear lamp housing 16 having a main body 50 and at least one and preferably two rearwardly and downwardly extending protrusions 52.

The main body 50 includes an upper edge 60, a lower edge 62 and rearward facing sections 64, 66 and 68. The protrusions 52 are formed with the main body 50 with one of the protrusions 52 being located between the sections 64 and 66 and the other protrusion 52 is located between the sections 66 and 68, as shown in FIG. 1. As is also shown in FIG. 1, the protrusions 52 are located spaced apart from respective lateral ends of the recess 18 but are significantly closer to respective lateral ends of the recess 18 than they are to one another.

As shown in FIG. 1, the main body 50 of the lamp housing 16 has an overall horizontal length $L_2$ and an overall height $H_2$. The overall length $L_2$ is measured along the width of the rear door 14. Each of the protrusions 52 has an overall height $H_3$. Each of the protrusions 52 also has an overall width $W_1$.

Each of the protrusions 52 extends from the top or upper edge 60 of the main body 50 to a location below the lower edge 62 of the main body 50 thereby defining an overhang 70 that extends below the lower wall portion 36 of the recess 18. A further description of the protrusions 52 is provided below.

Figure 7:
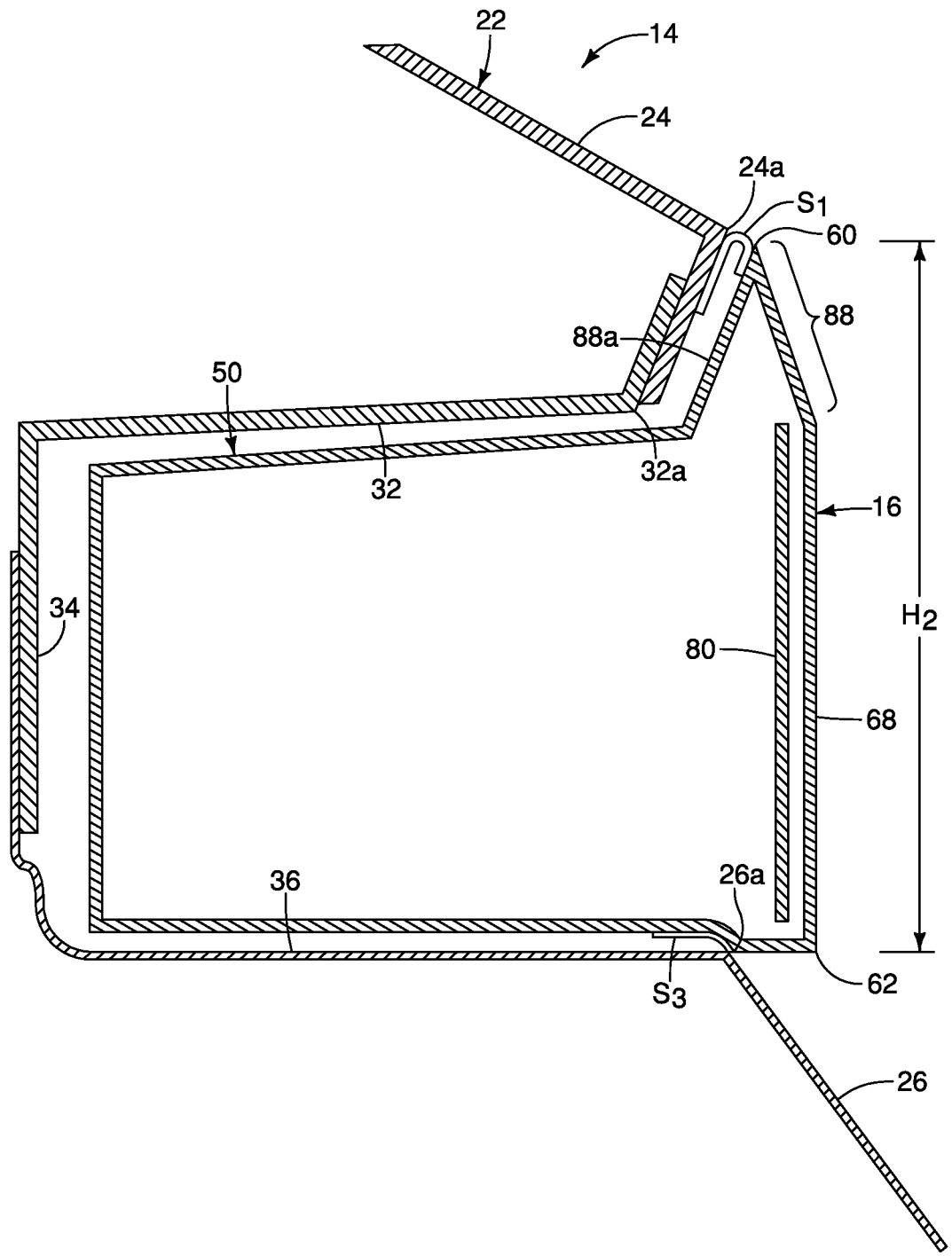
FIG. 7 is a side cross-sectional view of the rear door taken along the line 7-7 in FIG. 2 showing details of the elongated recess and the main body of the rear lamp housing with the rear lamp housing installed to the elongated recess in accordance with the first embodiment.

With the lamp housing 16 installed within the recess 18 as shown in FIGS. 5 and 7, the upper edge 60 of the main body 50 is located adjacent to and alongside the lower edge 24a of the upper outer panel portion 24. The lower edge 62 of the main body 50 is located adjacent to (proximate) the upper edge 26a of the lower outer panel portion 26. The protrusion 52 extends below the upper edge 26a of the lower outer panel portion 26 and below the rear lamp recess 18. The portion of the protrusion 52 that extends downward from the upper edge 26a of the lower outer panel portion 26 and below the rear lamp recess 18 defines the overhang 70.

Figure 6:
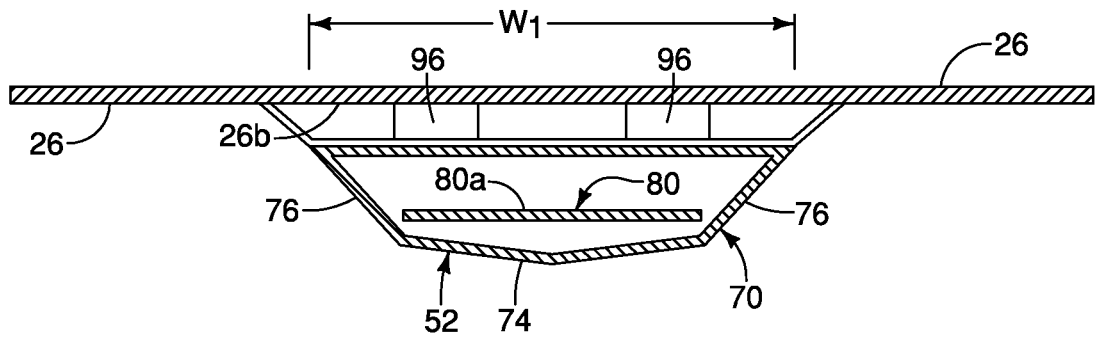
FIG. 6 is a top cross-sectional view of the rear door taken along the line 6-6 in FIG. 5 showing details the overhang of the rear lamp housing in accordance with the first embodiment.
Figure 8:
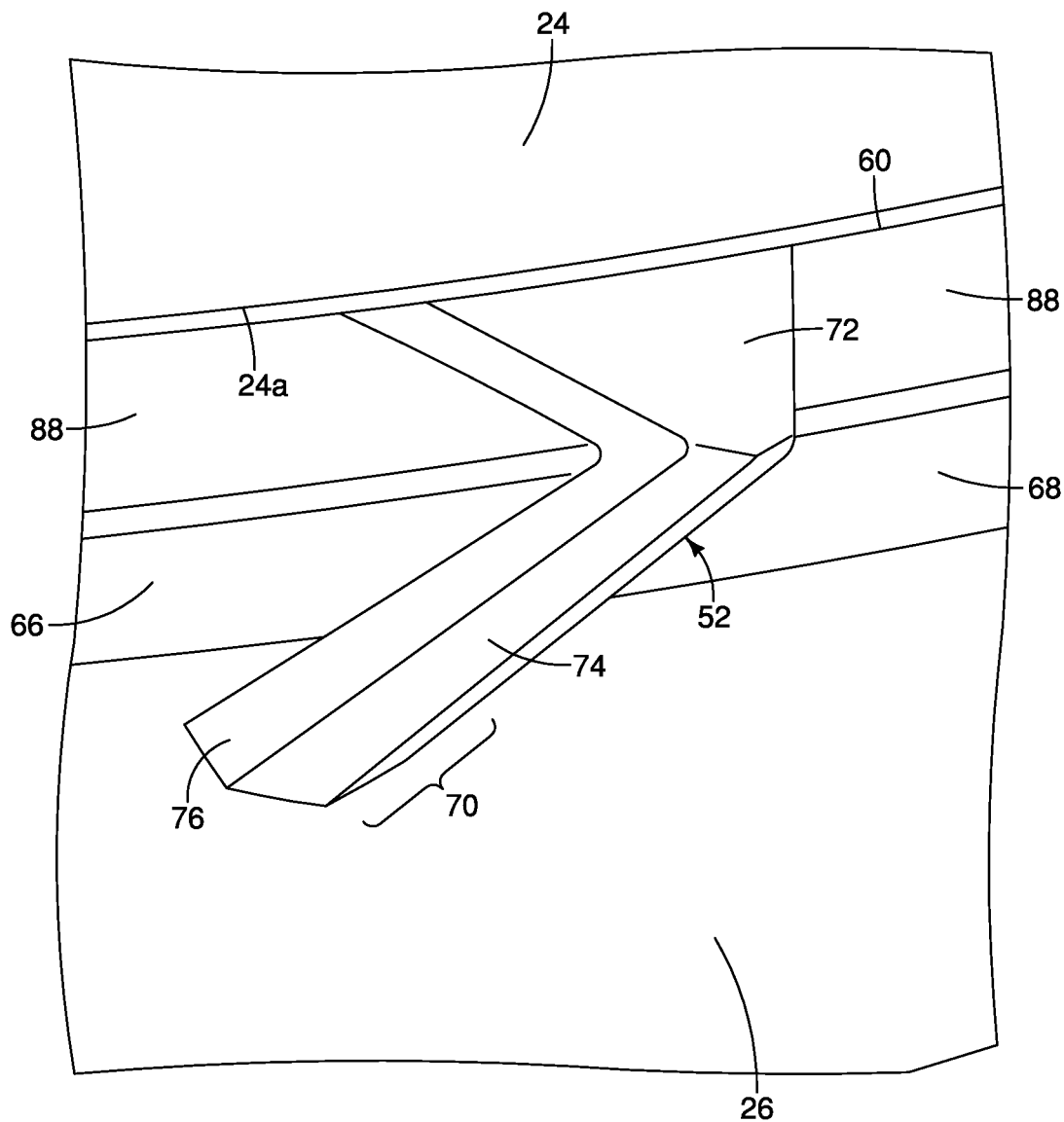
FIG. 8 is a perspective view of the rear door and the rear lamp housing showing details of the projection in accordance with the first embodiment.

Each protrusion 52 has an upper surface 72, a main surface 74 and lateral or side surfaces 76, as shown in FIGS. 1 and 8. Each of the protrusions 52 is formed as a single unitary, monolithic structure with the main body 50, but alternatively, can be separate elements welded to or fixed to the main body via adhesive materials. As shown in FIGS. 5, 6 and 7, the rear lamp housing 16 has a hollow interior and includes an LED lighting array 80 (also referred to as the lighting array 80) that is positioned in a rearward area of the main body 50 and the projections 52.

The lighting array 80 can include a plurality of separately controlled lighting sections that can define, for example, back-up lights, turn signal lights, braking lights and running lights. One or more of the plurality of separately controlled lighting section of the lighting array 80 can be located within the projections 52 and can include a downwardly extending panel section 82 that extends into the overhang 70 of each projection 52 as shown in FIGS. 5 and 6. Several of the plurality of separately controlled lighting sections of the lighting array 80 can be located within the rearward facing section 64, 66 and 68 of the main body 50.

The overhang 70 overlays a portion 26b of the lower outer panel portion 26 below the upper edge 26a of the lower outer panel portion 26.

The overall length $L_2$ of the main body 50 of the rear lamp housing 16 is much greater than the overall width $W_1$ of each of the rearwardly projection 52. Although the projections 52 are located proximate opposite ends of the elongated recess 18 (the rear lamp recess 14) the protrusions 52 are spaced apart from the opposite ends of the elongated recess 18, respectively.

The main body 50 of the rear lamp housing 16 includes an upper section 88 that is dimensioned and shaped to cover and conceal the inclined wall portion 30 of the recess 18. The upper section 88 is interrupted by the projections 52 but otherwise extends the entire horizontal length $L_2$ of the main body 50. A concealed section 90 of the main body 50 is inserted into the recess 18. A fastener $F_1$ and nut $N_1$ attached the main body 50 to the outer door panel 22 at the vertical wall portion 34 of the recess 18, as shown in FIG. 5. There are at least two fasteners $F_1$ and nuts $N_1$ although only one pair is shown in FIG. 5. The fasteners $F_1$ and nuts $N_1$ can be in alignment with the projections 52 and/or can be spaced apart from one another at various locations within the recess 18. Hence, the concealed section 90 is retained within a cavity of the rear lamp recess 18 between the upper wall portion 32 and the lower wall portion 34 with a forward surface of the main body 50 of the rear lamp housing 16 being adjacent to the vertical wall portion 34 (forward surface being relative to the orientation of the vehicle 10).

As shown in FIG. 5, the main body 50 includes an upper seal $S_1$ that extends between the inclined wall portion 30 of the elongated recess 18 and an inclined wall 88a of the upper section 88 of the main body of the rear lamp housing 16. The upper seal $S_1$ extends the entire horizontal length $L_2$ of the main body 50 and can optionally include vertical seal sections (not shown) that extend between ends of the main body 50 and the lateral end walls 38 and 40 of the elongated recess 18. A lower seal $S_2$ is installed between the overhang 70 and the portion 26b of the lower outer panel portion 26. The upper seal $S_1$ and the lower $S_2$ block water from infiltrating the elongated recess 18.

As shown in FIGS. 5 and 6, the rear lamp housing 16 can also include cushioning blocks 96 that are installed between the overhang 70 of the projections 52 and the portion 26b of the lower outer panel portion 26 of the outer door panel 22 covered by overhang 70. The blocks 96 are preferably made of a foam material and are provided for noise reduction by preventing contact between the overhang 70 and the portion 26b of the lower outer panel portion 26 of the outer door panel 22 covered by overhang 70.

The main body 50 and the projections 52 have the following relationships. For example, the overall length $L_2$ of the main body 50 of the rear lamp 16 is at least 9 times greater than the first overall width $W_1$ of each of the projecting protrusion 52 (projections 52). Further, the overall length $L_2$ of the main body 50 of the rear lamp 16 can be 10 times greater than the first overall width $W_1$ of each of the projecting protrusion 52 (projections 52). Still further, the overall length $L_2$ of the main body 50 of the rear lamp 16 can be 18 times greater than the first overall width $W_1$ of each of the projecting protrusion 52 (projections 52). Still further, the overall length $L_2$ of the main body 50 of the rear lamp 16 is at least 20 times greater than the first overall width $W_1$ of each of the projecting protrusion 52 (projections 52).

The main body 50 of the rear lamp housing 16 has an overall height $H_2$ measured perpendicular to the first overall length $L_2$ of the main body 50. The projections 52 each have an overall height $H_3$ that is greater than the overall height $H_2$ of the main body 50. Further, the overall height $H_3$ is between 1.2 and 1.8 times greater than the overall height $H_2$ of the main body 50. Still further, the overall height $H_3$ can be 1.5 times greater than the overall height $H_2$ of the main body 50.

The design of the elongated recess 18 and the rear lamp housing 16 described above has advantages over lamp structures that include projections from a main body of a lamp housing. The manufacturing process for creating recesses for lamp houses with non-linear surface or irregular shapes that are not rectangular requires costly tooling and complex welding techniques with the body structure being made of metal. For example, if a recess is provided with a recessed section that is to accommodate receiving a main housing and projection similar to the main housing 50 and projection 52, the recessed section shaped to receive the projection would need to extend perpendicular to the main recess dimensioned for a main body. Such a design is costly and complex to produce.

In the above design where the projections 52 includes the overhang 70 that overlays a portion 26b of the lower outer panel portion 26, the elongated recess 18 remains a simple rectangular shape thereby reducing manufacturing costs. The overhang 70 of the projections 52 of the rear lamp housing 16 provides a design feature that has an appealing appearance without costly manufacturing techniques to achieve the appealing appearance.

As is shown in FIGS. 1, 5 and 7, the upper edge 60 of the main body 50 of the rear lamp housing 16 is approximately even and level with the lower edge 24a of the upper outer panel portion 14. The lower edge 24a basically defined the upper boundary of the recess 18. Therefore, the upper edge 60 does not define an overhang but rather the main body 50 mates with the inclined surface portion 30 of the elongated recess 18. Further, as shown by comparing FIGS. 5 and 7 and the disclosure of FIG. 8, the projections 52 both extend further rearward of the upper and lower outer door panel portions 24 and 26 than the main body 50 of the rear lamp housing 16.

Second Embodiment

Figure 9:
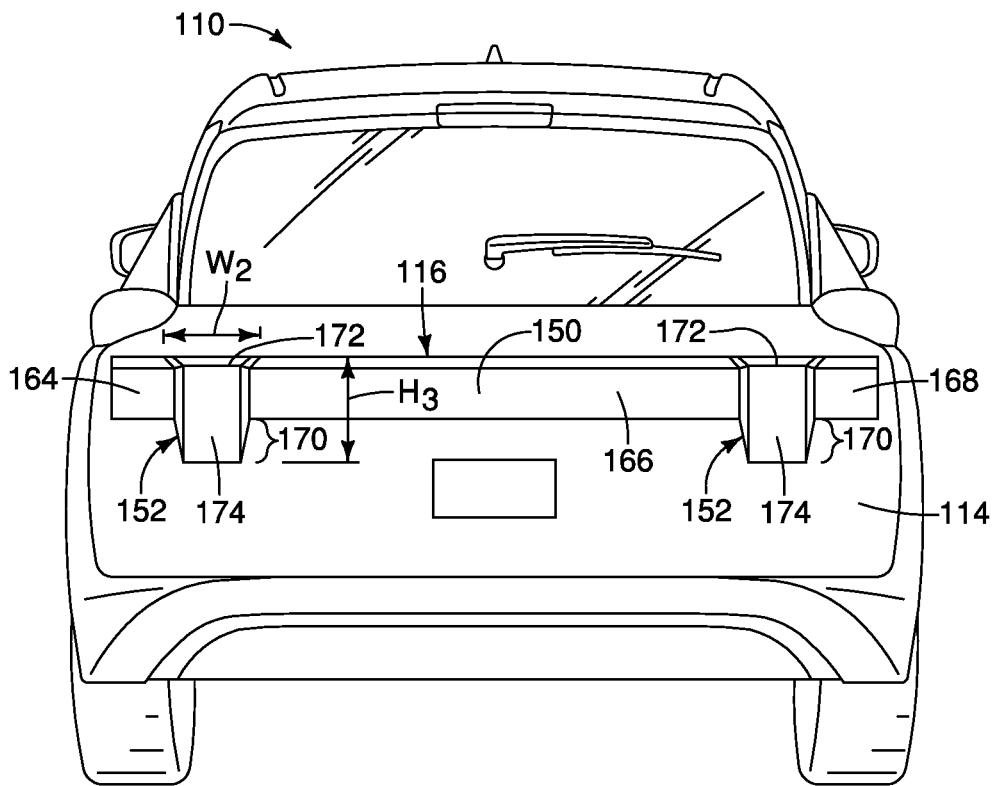
FIG. 9 is a rear view of a vehicle that shows a rear door supporting a rear lamp housing that includes a pair of projections that extend downward from a main body of the rear lamp housing defining an overhang in accordance with a second embodiment.
Figure 10:
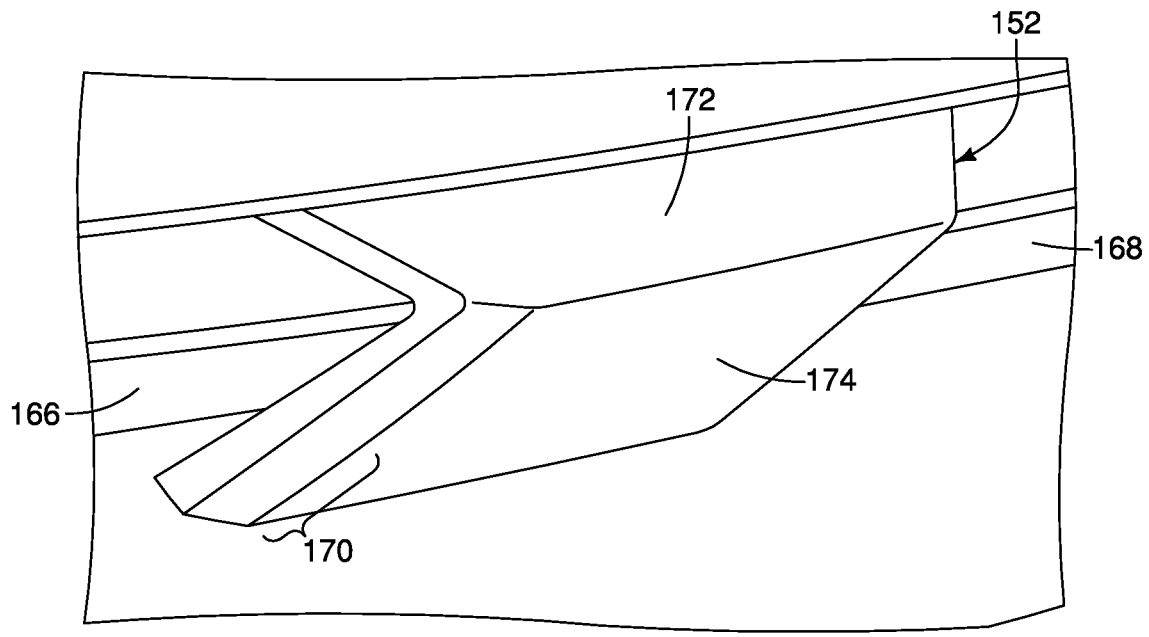
FIG. 10 is a perspective view of the rear door and the rear lamp housing showing details of the projection in accordance with the second embodiment.

Referring now to FIGS. 9 and 10, a vehicle 110 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The vehicle includes a rear door 114 having a recess (not shown) that is identical to the recess 18 of the first embodiment and a rear lamp housing 116. The rear lamp housing 116 has a main body 150 and a pair of projections 152. The main body 150 is basically the same as the main body 50 of the first embodiment except that the attached pair of projections 152 have differing dimensions as compared to the projections 52 of the first embodiment.

The main body 150 includes rearward facing sections 164, 166 and 168 (similar to sections 64, 66 and 68 of the first embodiment). Each of the projections 152 include an overhang 170, an upper surface 172 and a main surface 174. The projections 152 each have a width $W_2$ that is greater than the width $W_1$ of the first embodiment.

The vehicle 10 includes many elements and components that are conventional components that are well known in the art. Since these elements and components are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle rear tail lamp structure. Accordingly, these terms, as utilized to describe the present invention should be interpreted relative to a vehicle equipped with the vehicle rear tail lamp structure.

The term "configured" as used herein to describe a component, section or part of a device includes structure that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle rear tail lamp structure, comprising:
   a rear door having an upper outer panel portion and a lower outer panel portion, with a rear lamp recess being defined between a lower edge of the upper outer panel portion and an upper edge of the lower outer panel portion; and
   a rear lamp housing having a main body with an upper edge, a lower edge and at least one rearwardly projecting protrusion, the upper edge of the main body of the rear lamp housing being located along the lower edge of the upper outer panel portion, the lower edge of the main body of the rear lamp housing being located along the upper edge of the lower outer panel portion and the protrusion extending below the upper edge of the lower outer panel portion below the rear lamp recess overlaying a portion of the lower outer panel portion below the upper edge of the lower outer panel portion.

2. The vehicle rear tail lamp structure according to claim 1, wherein
   the rear lamp recess extends from proximate a first lateral side of the rear door to proximate a second lateral side of the rear door opposite the first lateral side.

3. The vehicle rear tail lamp structure according to claim 2, wherein
   the rear lamp housing extends from proximate a first end of the rear lamp recess to proximate a second end of the rear lamp recess opposite the first lateral side of the rear lamp recess.

4. The vehicle rear tail lamp structure according to claim 1, wherein
   the rear lamp recess is formed from sheet metal material.

5. The vehicle rear tail lamp structure according to claim 1, wherein
   the upper outer panel portion, the rear lamp recess and the lower outer panel portion are all formed from metal sheet materials welded together to form at least a portion of the rear door.

6. The vehicle rear tail lamp structure according to claim 1, wherein
   the lamp recess is defined by an inclined wall portion, an upper wall portion, a vertical wall portion and a lower wall portion, the upper wall portion and the lower wall portion extending in horizontal directions with the vertical wall portion extending therebetween.

7. The vehicle rear tail lamp structure according to claim 6, wherein
   the inclined wall portion extends upward and rearward from a rear edge of the upper wall portion to the lower edge of the upper outer panel portion.

8. The vehicle rear tail lamp structure according to claim 7, wherein
   the main body of the rear lamp housing includes an upper section dimensioned and shaped to cover and conceal the inclined wall portion and a concealed section that is retained within a cavity of the rear lamp recess defined between the upper wall portion and the lower wall portion with a forward surface of the main body of the rear lamp housing being adjacent to the vertical wall portion.

9. The vehicle rear tail lamp structure according to claim 1, wherein
   a rear lamp housing having the main body of the rear lamp housing has a first overall length measured along the width of the rear door and the at least one rearwardly projecting protrusion extends has a first overall width measured along the width of the rear door, the first overall length of the main body of the rear lamp housing being greater than the first overall width of the at least one rearwardly projecting protrusion.

10. The vehicle rear tail lamp structure according to claim 9, wherein
    the first overall length of the main body of the rear lamp is at least 9 times greater than the first overall width of the at least one rearwardly projecting protrusion.

11. The vehicle rear tail lamp structure according to claim 10, wherein
    the first overall length of the main body of the rear lamp is at least 18 times greater than the first overall width of the at least one rearwardly projecting protrusion.

12. The vehicle rear tail lamp structure according to claim 9, wherein
    the first overall length of the main body of the rear lamp is 10 times greater than the first overall width of the at least one rearwardly projecting protrusion.

13. The vehicle rear tail lamp structure according to claim 10, wherein
    the first overall length of the main body of the rear lamp is 20 times greater than the first overall width of the at least one rearwardly projecting protrusion.

14. The vehicle rear tail lamp structure according to claim 9, wherein
    the main body of the rear lamp housing has a first overall height measured perpendicular to the first overall length of the main body, and
    the at least one rearwardly projecting protrusion has a second overall height that is greater than a first overall height of the main body.

15. The vehicle rear tail lamp structure according to claim 14, wherein
    the second overall height is between 1.2 to 1.8 times the first overall height.

16. The vehicle rear tail lamp structure according to claim 15, wherein
    the second overall height is 1.5 times the first overall height.

17. The vehicle rear tail lamp structure according to claim 1, wherein
    the at least one rearwardly projecting protrusion includes a first and a second rearwardly projecting protrusion that are spaced apart from one another.

18. The vehicle rear tail lamp structure according to claim 7, wherein
    the first rearwardly projecting protrusion located proximate a first end of the rear lamp recess and the second rearwardly projecting protrusion is located proximate a second end of the rear lamp recess.

* * * * *